United States Patent
Tran et al.

(10) Patent No.: US 10,990,345 B2
(45) Date of Patent: Apr. 27, 2021

(54) SYNCHRONIZATION OF DIGITAL CONTENT CONSUMPTION

(71) Applicant: Facebook Technologies, LLC, Menlo Park, CA (US)

(72) Inventors: Thai Gia Tran, Palo Alto, CA (US); Aditya Aghi, Menlo Park, CA (US); Olivier Alain Pierre Notteghem, San Francisco, CA (US); Gregory Stephen Williams, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/823,635

(22) Filed: Mar. 19, 2020

(65) Prior Publication Data

US 2020/0218495 A1    Jul. 9, 2020

Related U.S. Application Data (63) Continuation of application No. 16/107,817, filed on Aug. 21, 2018, now Pat. No. 10,628,115.

(51) Int. Cl.
*G06F 3/14* (2006.01)
*H04L 7/00* (2006.01)

(52) U.S. Cl.
CPC .......... *G06F 3/1454* (2013.01); *H04L 7/0008* (2013.01)

(58) Field of Classification Search
CPC ... G06F 3/1454; H04L 7/0008; H04L 65/403; H04N 21/47202; H04N 21/4302; H04N 21/4307; H04N 21/41407; H04N 21/4788; H04N 21/632; H04N 21/4227; G06T 2219/024
See application file for complete search history.

(56) References Cited

U.S. PATENT DOCUMENTS

2010/0306655 A1    12/2010   Mattingly
2017/0295229 A1 *  10/2017   Shams .................. G06F 3/14

OTHER PUBLICATIONS

International Search Report and Written Opinion for International Application No. PCT/US2019/046548, dated Oct. 23, 2019.

* cited by examiner

*Primary Examiner* — Koosha Sharifi-Tafreshi
(74) *Attorney, Agent, or Firm* — Baker Botts L.L.P.

(57) ABSTRACT

In one embodiment, a method includes receiving playback statuses from a first user computing device and a second user computing device that are in a synchronous presentation session. Content presented on the first and second user computing devices may be determined to be out of synchronization. User behavioral rules associated with the first user computing device may be accessed. The user behavioral rules may be learned based on past behavior of the first user in the synchronous presentation session. A synchronization message may be generated to send to the first user computing device based on the user behavioral rules. The synchronization message may include instructions for the first user computing device to perform an action to cause the content being presented by the first user computing device to be synchronized with the content being presented by the second user computing device.

20 Claims, 8 Drawing Sheets

SYNCHRONIZATION OF DIGITAL CONTENT CONSUMPTION

PRIORITY

This application is a continuation under 35 U.S.C. § 120 of U.S. patent application Ser. No. 16/107,817, filed 21 Aug. 2018, which is incorporated herein by reference.

TECHNICAL FIELD

This disclosure generally relates to consuming digital content in virtual reality.

BACKGROUND

Conventionally, users who wanted to consume digital content like a movie or a TV show would be limited to watching that content on conventional display devices such as phones, personal computers (e.g., a laptop or desktop), or TV sets. These conventional display devices are often only appropriate for individual or small groups of users because of the small size and limited display abilities of the screens associated with these devices. In some cases, users could gather in a movie theater or a friend's house for a more social viewing experience, but in all cases the viewing experience is limited to a physical setting (e.g., a movie theater, living room, etc.).

To resolve some of these limitations, methods for consuming digital content in a virtual reality (VR) environment have been developed. VR devices, which allow users to consume digital content in any virtual environment, may provide users with a more immersive and varied viewing experience. For example, instead of watching a movie on a TV set in one's living room, a user may watch the movie in a virtual theater over the ocean. But conventional VR devices suffer from the distinct disadvantage that they are solitary devices. Because VR devices are usually headsets aimed at providing a visual and auditory experience for just one user, the typical content-viewing experience through VR lacks social interaction between users in the VR environment (e.g., each user would be watching a movie alone).

SUMMARY OF PARTICULAR EMBODIMENTS

Embodiments of this invention are related to allowing multiple users of virtual reality devices to co-watch digital content. It should be understood that "co-watch" may mean any synchronized consumption of digital content and does not necessarily mean only synchronized co-consumption of visual content. Rather, co-watching may include synchronized consumption of content based on sight, sound, smell, touch, or taste. Furthermore, it should be understood that the embodiments described in this application that relate to virtual reality devices may also relate to any other type of personal computing device including phones, TVs, desktop or laptop computers, gaming devices, or any other device capable of presenting digital content to a user.

In some embodiments, multiple users may share a space in a virtual environment. Those users may wish to jointly consume digital content, such as a movie, music, or a TV show. In some embodiments, a single server may host the digital content, and directly, concurrently stream it to the user device of each user of the virtual space. These embodiments may track which user devices should be included in a viewing session and track the playback of content on each user device. Some embodiments may allow direct control over the playback of each stream and may allow playback controls operated on any one device to affect playback on all of the remaining devices. However, these embodiments require that the operator of the virtual space have direct access and rights to the digital content that is being streamed. This can require significant expenditures of time and money to accomplish and lacks scalability. As such, other embodiments of this invention may allow multiple users in a shared virtual space to seamlessly and concurrently consume digital content, with each user separately streaming the content directly from a third-party content application. In this way, embodiments of this invention may allow multiple users, each running their own instance of a third-party content application, to jointly consume the same digital content and enjoy a social co-watching experience within virtual reality.

In some embodiments, a third-party content application may be used by a plurality of users to stream content directly to those users' virtual reality devices. Some embodiments may begin when each of a plurality of users downloads a third-party application associated with a third-party content provider onto a respective plurality of virtual reality devices. The third-party application may communicate with the third-party content provider to stream content to the users and to enable and control playback through the virtual reality devices. In some embodiments the content may be played across the full screen of the virtual reality devices. In other embodiments, the content may be reprojected onto a virtual screen within a virtual environment. Reprojection is a technique which may allow for third-party content to be directly shared from a third-party content application to a virtual reality device and cast directly into a virtual reality environment on the virtual reality device. In some embodiments this may include reprojecting content from a third-party content application onto a virtual TV or a movie theater screen in a VR environment. In some embodiments the users may be represented by avatars within the virtual environment. The avatars may be represented as human characters and may be seated together on a couch, in a movie theater, or in any other appropriate venue or location. The users' reactions to the presented content may be reflected by the avatars in real-time, thereby providing the users with a social co-watching experience.

Some embodiments may utilize one of at least three models for synchronizing digital content. Those models are referred to as the "host-guest" model, the "server" model, and the "omni" model. Each model may differ in how the virtual reality devices are connected and communicated, and the level of control that any one device may have over the remaining devices. Each of the three models will be described in additional detail, below.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In some embodiments, multiple users of user computing devices may seek to co-watch the same digital content. For example, two or more users may be separated by a geographical distance but may nonetheless wish to co-watch the same content. As another example, two or more users may be in the same geographic location, but may only have access to, or might otherwise desire to use, user computing devices that are best suited for use by a single user (e.g., a virtual reality headset). In such embodiments, the two or more users may desire a method with which they can co-watch digital content such that the digital content is synchronized across two or more user computing devices.

Figure 1:
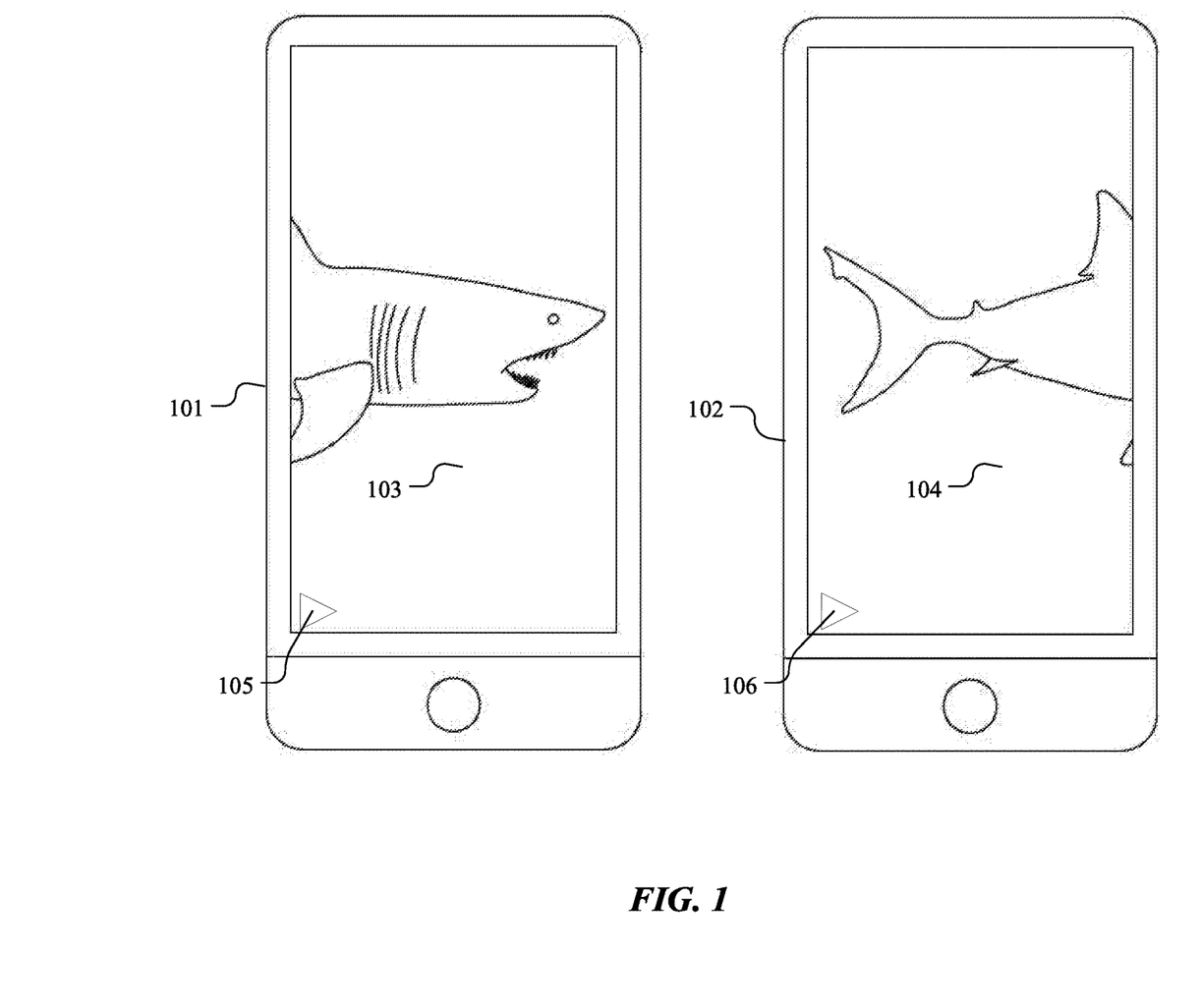
FIG. 1 illustrates an embodiment in which a plurality of user computing devices present the same digital content.

In some embodiments, multiple users of user computing devices may be able to consume the same digital content without synchronization of the content. FIG. 1 illustrates an embodiment in which a plurality of user computing devices present the same digital content. In this embodiment, user computing devices 101 and 102 are each presenting digital content from the movie "Jaws." In some embodiments, the devices may obtain the content from the local storage of the device. In other embodiments, the content may be obtained through a streaming service, including a third-party content provider's streaming service. The user computing devices 101 and 102 may be virtual reality devices. In some embodiments, the user computing devices may also be any other type of user computing device, including a cell phone, TV, desktop monitor, laptop, or any other device capable of presenting digital content to one or more users. In some embodiments, user computing device 101 may be presenting frame 103 of the movie while user computing device 102 may be presenting frame 104. In some embodiments, the users of the user computing devices may attempt to synchronize the playback of content across the plurality of user computing devices by selecting similar or identical viewing settings (screen size, volume, playback speed, etc.) and selecting the play buttons 105 and 106 at the same time. Despite these efforts, in some embodiments, the content presented on the two devices may be out-of-synch (e.g., frame 104 may be a short amount of time before or after frame 103). For example, computing device 102 may have already shown the head of a shark swimming by and may instead show the tail of the shark (frame 104) at the same point in time that computing device 101 shows the head of the shark (frame 103). This time difference may be caused by any number of causes including a slight difference in when the play buttons 105 and 106 were selected on each of the user computing devices or due to a difference in network connection, buffering or playback speed between the devices, as examples. Any number of additional causes including software or hardware-based causes (e.g., differences in software versions or hardware models) may also result in a difference in playback between the devices.

Figure 2:
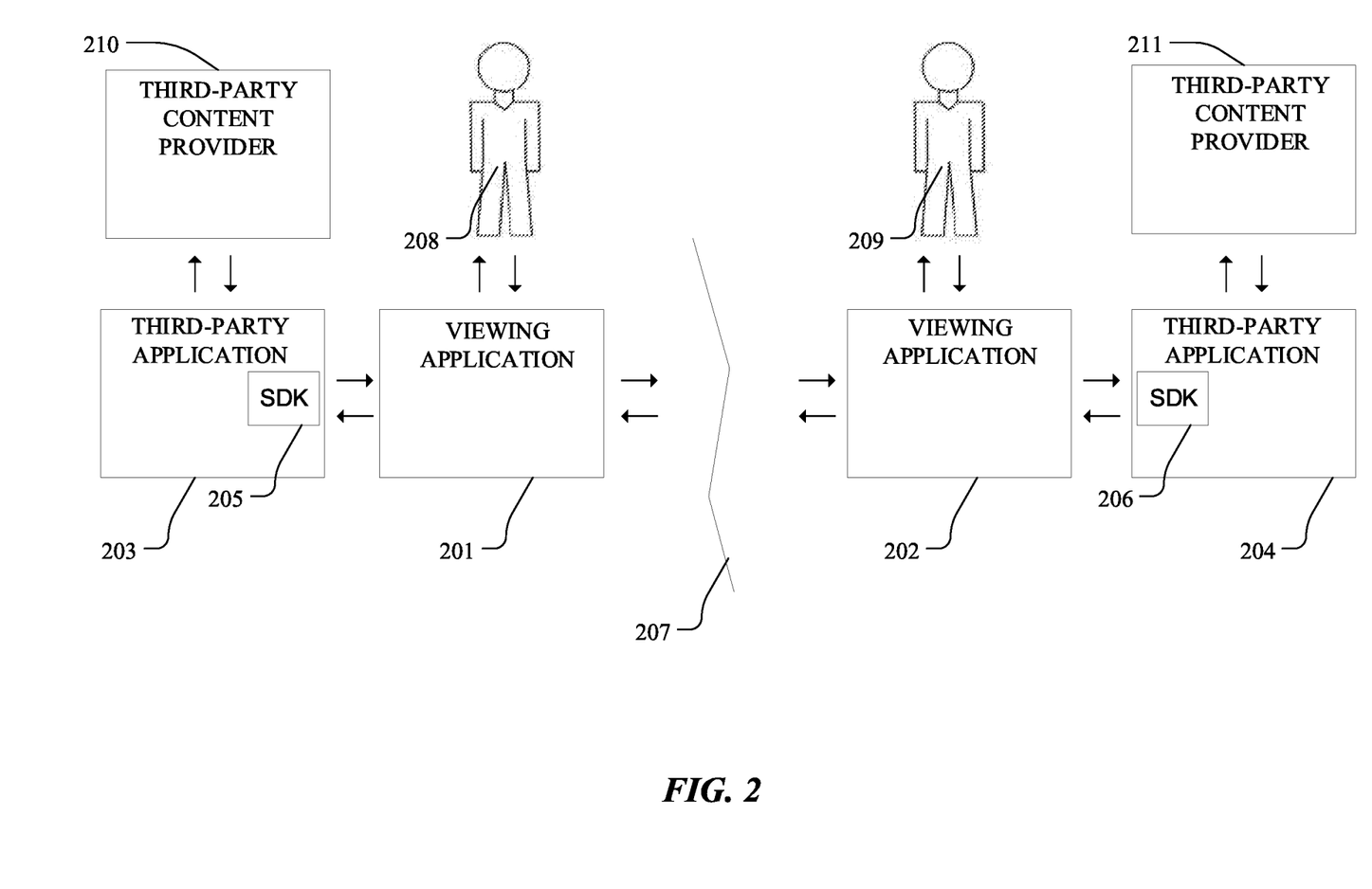
FIG. 2 illustrates an example embodiment in which multiple users of user computing devices co-watch content provided by an instance of a third-party application.

FIG. 2 illustrates an example embodiment in which multiple users of user computing devices co-watch content provided by an instance of a third-party application. In some embodiments, users 208 and 209 may interact with their respective user computing devices through viewing applications 201 and 202. In some embodiments these applications may be virtual reality applications, co-watching applications, or any other application on the user computing devices with which the users may interact. These user computing devices may include any user computing devices capable of presenting digital content. In some embodiments, instances 203 and 204 of the same third-party application may host digital content that users 208 and 209 desire to co-watch on their respective user computing devices. Each instance 203 and 204 of the third-party application may share information back and forth with the user computing devices 201 and 202. This information may include the digital content to be presented on the user computing devices, playback and other controls related to the digital content, and status information related to the playback of the digital content on the user computing devices. Each instance 203 and 204 may receive content as a digital stream from each of third-party content providers 210 and 211. In some embodiments third-party content providers 210 and 211 may be the same third-party content provider. In other embodiments third-party content providers 210 and 211 may be different third-party content providers. In some embodiments in which 210 and 211 are different third-party content providers, the third-party content providers may each offer the same digital content for display to the users 208 and 209. In some embodiments, the information being passed may be passed from the instances 203 and 204 of the third-party application through software written using a software development kit (SDK) 205 and 206 implemented by each instance of the third-party applications. In some embodiments, the SDK based software 205 and 206 may communicate with the user computing devices by generating a broadcast intent and sending the broadcast intent to the corresponding viewing application running on a user computing device (e.g., SDK based software 205 may communicate with 201 and 206 with 202). In some embodiments, the third-party applications 203 and 204 may contain two or more states, wherein at least one state is directed to sending information to the user computing devices and one state is directed to receiving information from the user computing devices. In some embodiments, the information that is being passed may include status information including a timestamp associated with a piece of digital content (e.g., the current playback time of a movie or TV show), identifying information related to a piece of digital content (e.g., the name of a movie or TV show), play or pause state information, volume, brightness, color, or playback speed information, or information related to whether a piece of digital content or an advertisement is being presented on the user computing devices 201 and 202.

As an example in which two users are co-watching content, the first user 208 may desire to fast forward the content. The user may select the fast forward control on his user computing device causing a fast forward command to pass through the viewing application 201, by way of the SDK based software 205, to the first user's instance of the third-party application 203. The third-party application may, in turn, request the third-party content from the third-party content provider 210. At the same time, the first user's viewing application may send the fast-forward command to the second user's 209 viewing application 202, which may in turn pass the command through the third-party application 204 to the third-party content provider 211.

In some embodiments, each user of a user computing device may retain individual or personalized control over some aspects or settings related to the presentation of the digital content. In other embodiments, all settings may be collectively controlled by the users. In some embodiments, individual users may have individual control over aspects or settings including volume and subtitles. As an example, user 208 may be using a user computing device 201 that has louder native audio than the audio from user 209's user computing device 202. This may be, for example, because user computing device 201 may be a virtual reality headset with speakers very close to user 208's ears, while user computing device 202 may be a TV mounted on a wall far from user 209.

In some embodiments, each user 208 and 209 may be presented with the same video content but different audio content. For example, user 208 and 209 may both speak English to communicate with one another, but may be more comfortable listening to sports commentary in their native languages, which may be Spanish for user 208 and Russian for user 209. In this embodiment, user 208 may be presented with the same video content as user 209 but with Spanish audio content, while user 209 may be presented with the video content with Russian audio content. In some embodiments, each user may be presented with individualized or personalized video content, which may differ from user to user. For example, in some embodiments user 208 may be presented with a soccer game with standard viewing angles and a chat window consisting of other users' commentary on the soccer game, while user 209 may be presented with a bird's eye view of the game and no chat window. As another example, each user's presentation options and digital environment may be distinct from any other user. For example, each user may have individual control over the lighting within the virtual reality environment in which they are watching the digital content. Similarly, each user may have individual control over the location of the screen, setting, or background within which the screen is located in a virtual reality environment (e.g., each user may choose separately to view the content in a virtual reality environment corresponding to one of a movie theater, a home living room, a tablet in bed, etc.). It should be understood that these are only examples and that personalization, individualization, or customization of video, audio, or other digital content may take any form.

As each user computing device 201 and 202 separately communicates with each instance of a third-party application 203 and 204, they may do so by way of communication method 207. In some embodiments, communication method 207 may be direct communication between the user computing devices, for example Bluetooth Low Energy or Infrared. In other embodiments, 207 may be indirect communication through a server associated with the viewing applications 201 and 202 or some other computing device associated with the viewing applications 201 and 202. Additional detail regarding the communication method is described in the figures below.

Figure 3:
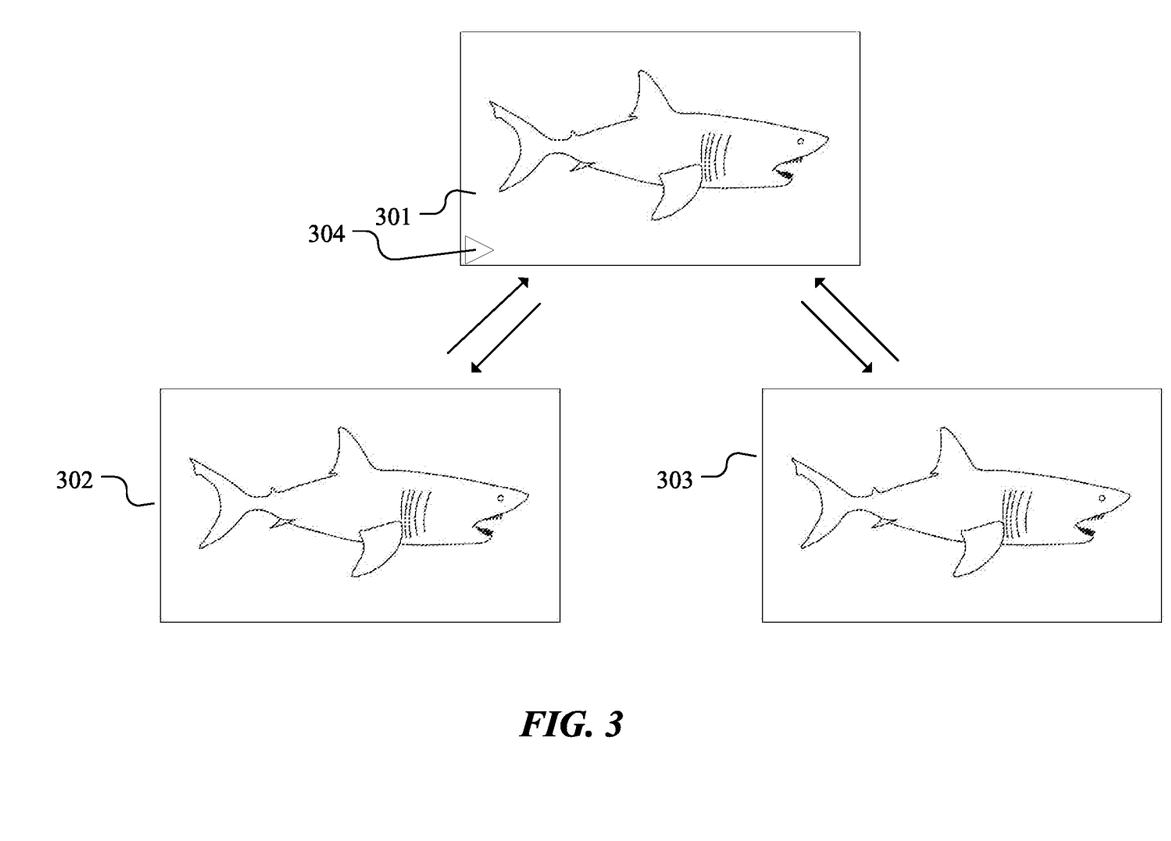
FIG. 3 illustrates an example embodiment utilizing the "host-guest" model.

FIG. 3 illustrates an example embodiment utilizing the "host-guest" model. The host-guest model may allow for a first user computing device 301 to be recognized as a host and all other users, for example 302 and 303, may be recognized as guests. In some embodiments, the host may have direct control of the digital content (e.g., selection of content, volume, playback of the content, etc.), and the guests may not have any control of the digital content. In these embodiments, the playback selections made on the host user computing device 301 may be communicated from the host user computing device 301 to one or more guest user computing devices 302 and 303. For example, with all three user computing devices paused during a particular scene in the movie "Jaws" the play button on the host user computing device 301 may be selected and the content of the movie may begin playing in a synchronized fashion across all three user computing devices 301, 302, and 303. In some embodiments, only the host user computing device may have visible control features associated with the playback of the digital content. For example in FIG. 3 only host user computing device 301 has a play button 304, while guest user computing devices 302 and 303 do not. In other embodiments, all the user computing devices may show the same playback functionality, but only the host's control features may be operable.

In some embodiments, guest user computing devices 302 and 303 may communicate their playback status and other information to host computing device 301. Based on timestamp information and other playback information received from the guest user computing devices, host user computing device 301 may send instructions to the guest user computing devices 302 and 303 to take action such that they remain in a synchronized presentation state with the host user computing device and with each other. This action may include pausing the digital content or changing the timestamp of the digital content such that the playback jumps forward or backward. In some embodiments this action may also include speeding up or down the playback of the digital content such that the playback of the content across all the devices regains synchronization without the user computing devices coming to a complete pause or jumping forward, thereby skipping over previously unwatched content. In some embodiments, the host user computing device 301 may relay its playback status to each of the guest user computing devices 302 and 303 such that the guest user computing devices can synchronize the playback of content. In other embodiments, the guest user computing devices 302 and 303 may relay their status to the host user computing device 301 which may take all of the guest user computing devices' status into consideration in a determination of which action should be taken (e.g., what sync to synchronize the playback of content across all of the devices. It should be understood that these actions and all other possible actions described in this application to sync content may be performed by all embodiments of the invention and are not necessarily associated with only the host-guest model or any other model described within.

Figure 4:
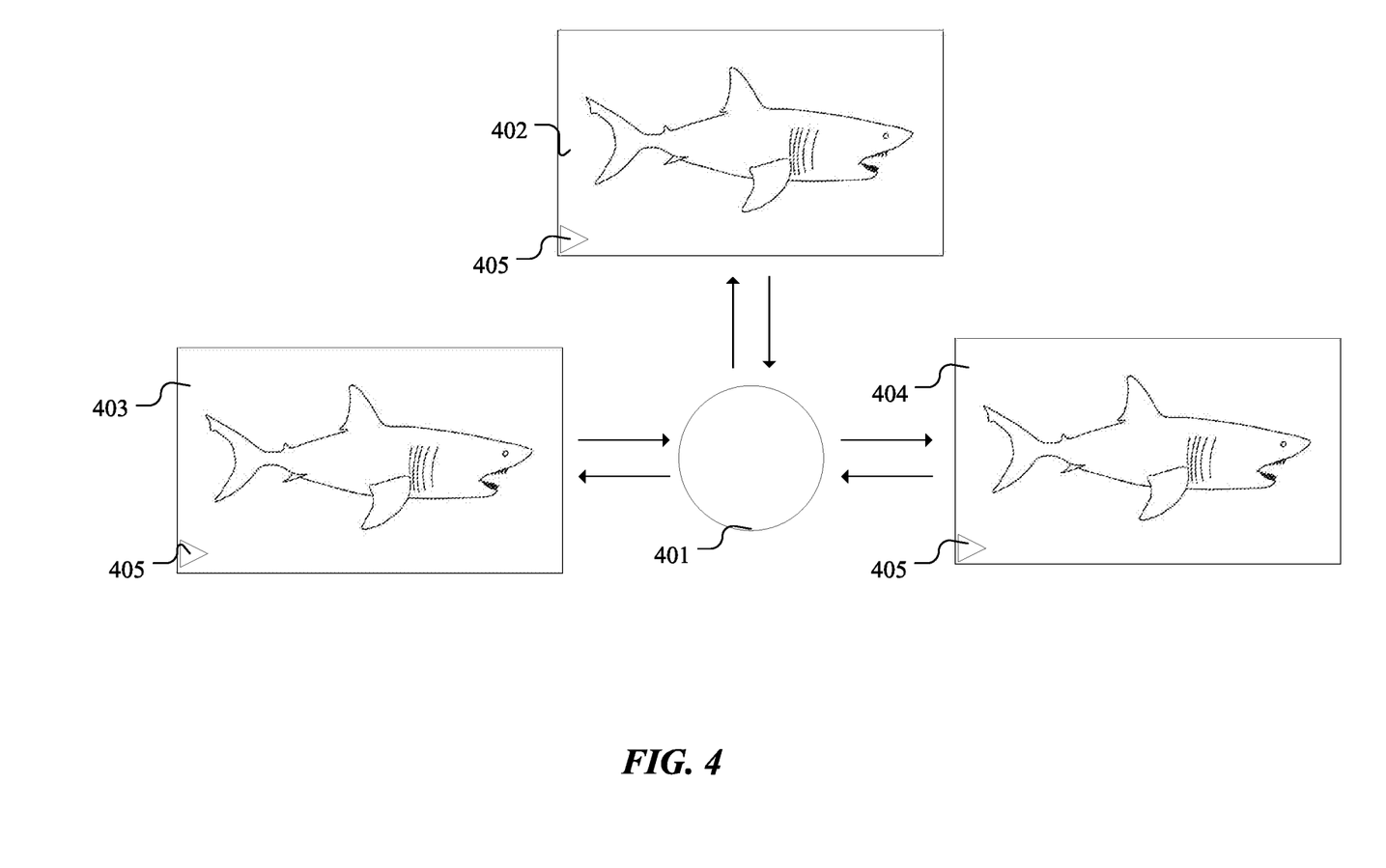
FIG. 4 illustrates an example embodiment utilizing the "server" model.

FIG. 4 illustrates an example embodiment utilizing the "server" model. The server model may allow for a server associated with a viewing application or some other computing device associated with the viewing application to track the presentation of digital content across all user computing devices, and may be configured to keep the users synced in their consumption. In some embodiments, server 401 may send and receive playback information associated with all of the user computing devices 402, 403, and 404. In some embodiments, all of the user computing devices may include playback controls, for example a play/pause button 405, which may allow the user of any one of the user computing devices to control the playback on all of the user computing devices. In some embodiments, the server 401 may be one of the user's user computing devices. In other embodiments, the server 401 may be a separate device, distinct from the user computing devices on which the content is being presented. In some embodiments, this separate device may be a device of one of the users, or it may be a remote server, accessed by the user computing devices via a network, such as the Internet.

In the server model, the server may track the playback of content across all of the user computing devices and employ rules to keep the playback of content synchronized. In some embodiments, any user (from 0 to all) may be capable of fully controlling the digital content. In some embodiments, the server may maintain an independently running clock, which may determine the pace at which digital content should be presented to the user devices. If any one user or subset of users gets ahead or behind of the independent clock, the user may be forced to skip or rewatch content to get back on pace with the clock. In some embodiments the rules for maintain the synchronization of content across all of the user computing devices may be preset by the user computing devices, by the third-party content applications, or may be determined by one or more of the users of the user computing devices. In some embodiments, the rules may be behavioral rules based on previous behavior of the users of the user computing devices. For example, if the playback of digital content on user computing device 402 has fallen behind the playback of digital content on user computing devices 403 and 404 two or more times in a session, and each time, the user of user computing device 402 has chosen to jump forward, thereby skipping content but regaining synchronization with the other user computing devices, then the rules for user computing device 402 may adapt to automatically jump forward whenever user computing device 402 falls behind in the presentation of content. These rules may be behaviorally learned on a per session, per user, per content item, or lifetime basis or on any other basis.

Figure 5:
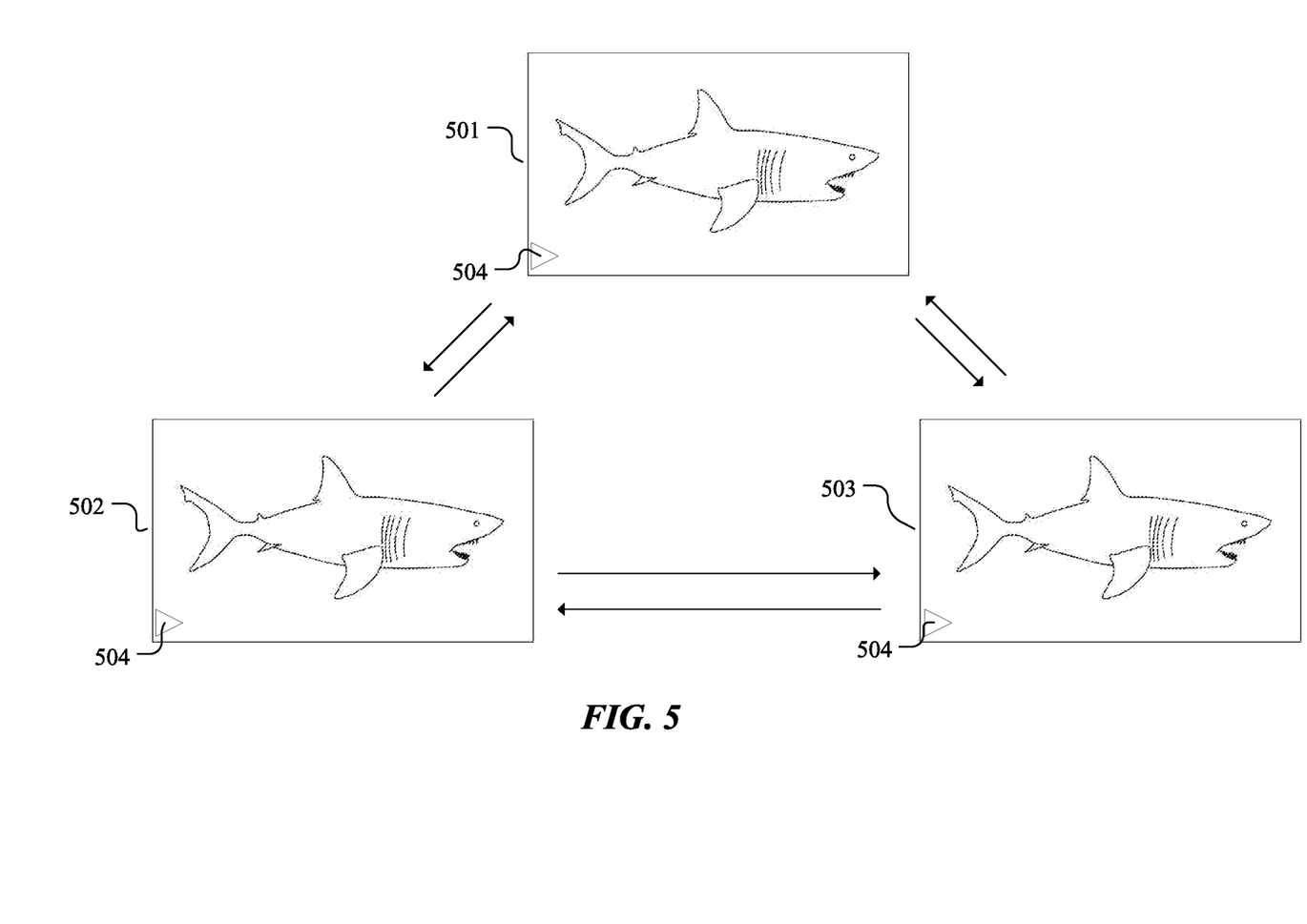
FIG. 5 illustrates an example embodiment utilizing the "everyone" model.

FIG. 5 illustrates an example embodiment utilizing the "omni" model. The omni model may allow for each user's device to track and sync with the devices of each of the other users. For example, under the omni model, each user device may separately communicate playback status or other information related to the playback of content on a particular user device (e.g., a playback control selection) with each other connected user device. In some embodiments, user devices 501, 502, and 503 may all communicate with one another and may all offer equal playback control, represented by 504. For example, each user of a user computing device 501, 502, 503 may each be presented with the same playback control options. If any one user selects a playback control option (e.g., fast forward) that option may be communicated to each other user computing device. In some embodiments, any user may then be able to cease fast forwarding, pause, or rewind the content, regardless of the playback control options selected by any other user. In some embodiments, when the user of user computing device 501 makes a selection to fast forward content, that selection may be communicated to the other user computing devices 502 and 503. Each user computing device may then pass the selection to a viewing application, on to an instance of a third-party content application, and beyond that to a third-party content provider, which pay provide the correct, fast forwarded content. It should be understood that 504 and any other representation of playback control may include any variable, controllable information or settings associated with the content or the user computing devices.

Like the server model, the omni model may allow for the implementation of various rules to ensure that all user computing devices are synchronized in their presentation of digital content. These rules may be presented as choices to the users while they are consuming content. For example, if two users are out of sync, with one user being ahead of the other, the users may be presented with options to 1) have the slower user skip ahead, 2) force the faster user to jump back and rewatch or wait until the slower user has caught up, or 3) do nothing, as examples. As another example, if there are three or more users who are co-watching content, with the playback of content on each user's device being out of sync with all other users, the users may be presented with options to 1) skip ahead to the fastest user, 2) jump back to the slowest user, 3) average the playback times across all devices and jump to the average playback time. Any number of additional options for rules may be utilized. In some embodiments, the threshold by which the user computing devices must be out of sync for a rule or policy to be utilized may be selected by the users of the user computing devices. In other embodiments, the threshold may be learned based on past user selections. Similarly, in some embodiments the choice of option may be selected as a default or it may be learned based on user selection history.

Figure 6:
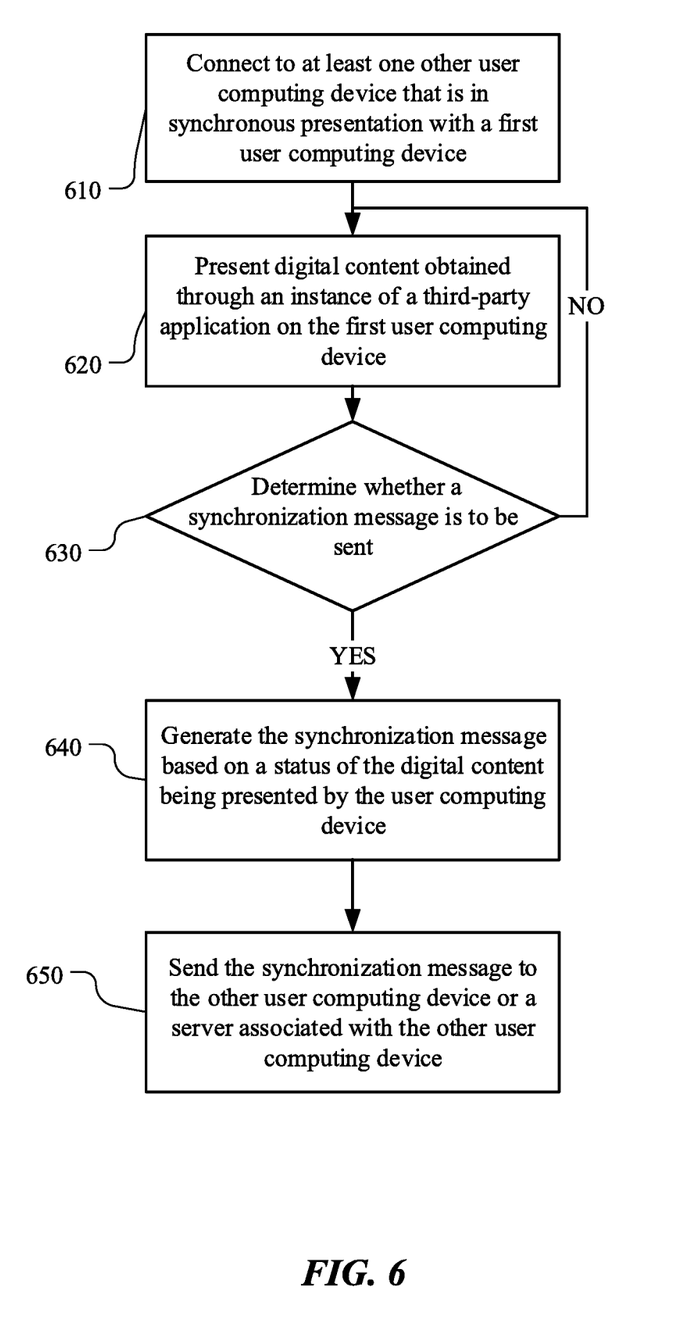
FIG. 6 illustrates an example method for presenting and synchronizing digital content across multiple user computing devices.

FIG. 6 illustrates an example method 600 for presenting and synchronizing digital content across multiple user computing devices. The method may begin at step 610, where a first user computing device connects with at least one other user computing device that is in a synchronous presentation session with the first user computing device. In some embodiments, step 610 may include determining whether other user computing devices are in range, are presenting the same content, or are otherwise identifiable as being in a synchronous presentation session with the first user computing device. As an example, in some embodiments, if a first user desires to co-watch content with a second user, the first user and the second user may log in or otherwise activate an application on their respective user computing devices. Once logged in, the users may opt-in to a synchronous presentation session such that the application may begin searching for and connecting the user computing devices of the first user and the second user. At step 620, the first user computing device may present digital content through an instance of a third-party application. In some embodiments, at the same time that the first user computing device is presenting digital content through an instance of a third-party application, one or more other user computing devices may also be presenting the same digital content through another instance of a third-party application. At step 630, a determination may be made regarding whether a synchronization message is to be sent to one or more additional user computing devices that are in the same presentation session as the first user computing device. If the user computing devices are all synchronized in their presentation of the digital content, no synchronization message may be sent. However, if one or more user computing devices are not synchronized or if a synchronization message should be sent based on some other determination (e.g., automatically per unit time, whenever a user selects a playback control option, whenever a new episode or scene from a piece of digital content begins, etc.), the method will proceed to step 640. At step 640, a synchronization message based on a status of the digital content being presented by the first user computing device may be generated. For example, if the playback of digital content on a first user computing device is two seconds ahead of the playback of the same content on a second user computing device, a message may include instructions to pause for two seconds or two rewind the presentation of the digital content on the first user computing device by two seconds. At step 650 the synchronization message may be sent to the at least one other user computing device or to a server associated with the at least one other user computing device. The synchronization message may be configured to cause a presentation of the digital content by the other user computing device to be synchronized with the presentation of the digital content by the first user computing device. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for presenting and synchronizing digital content across multiple user computing devices including the particular steps of the method of FIG. 6, this disclosure contemplates any suitable method for presenting and synchronizing digital content across multiple user computing devices including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

INVENTORS—BOILERPLATE BEGINS HERE

Figure 7:
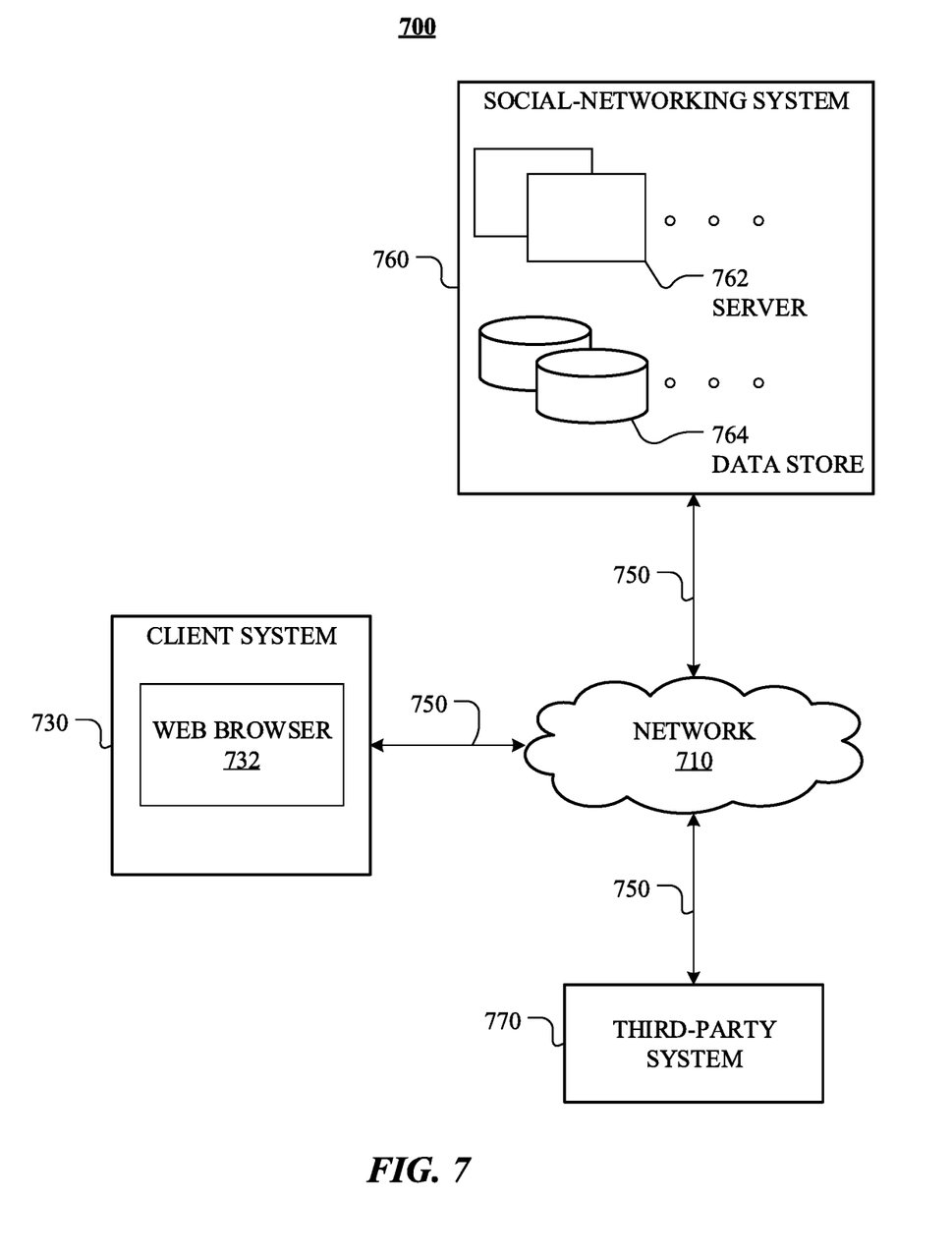
FIG. 7 illustrates an example network environment 700 associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user.

This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
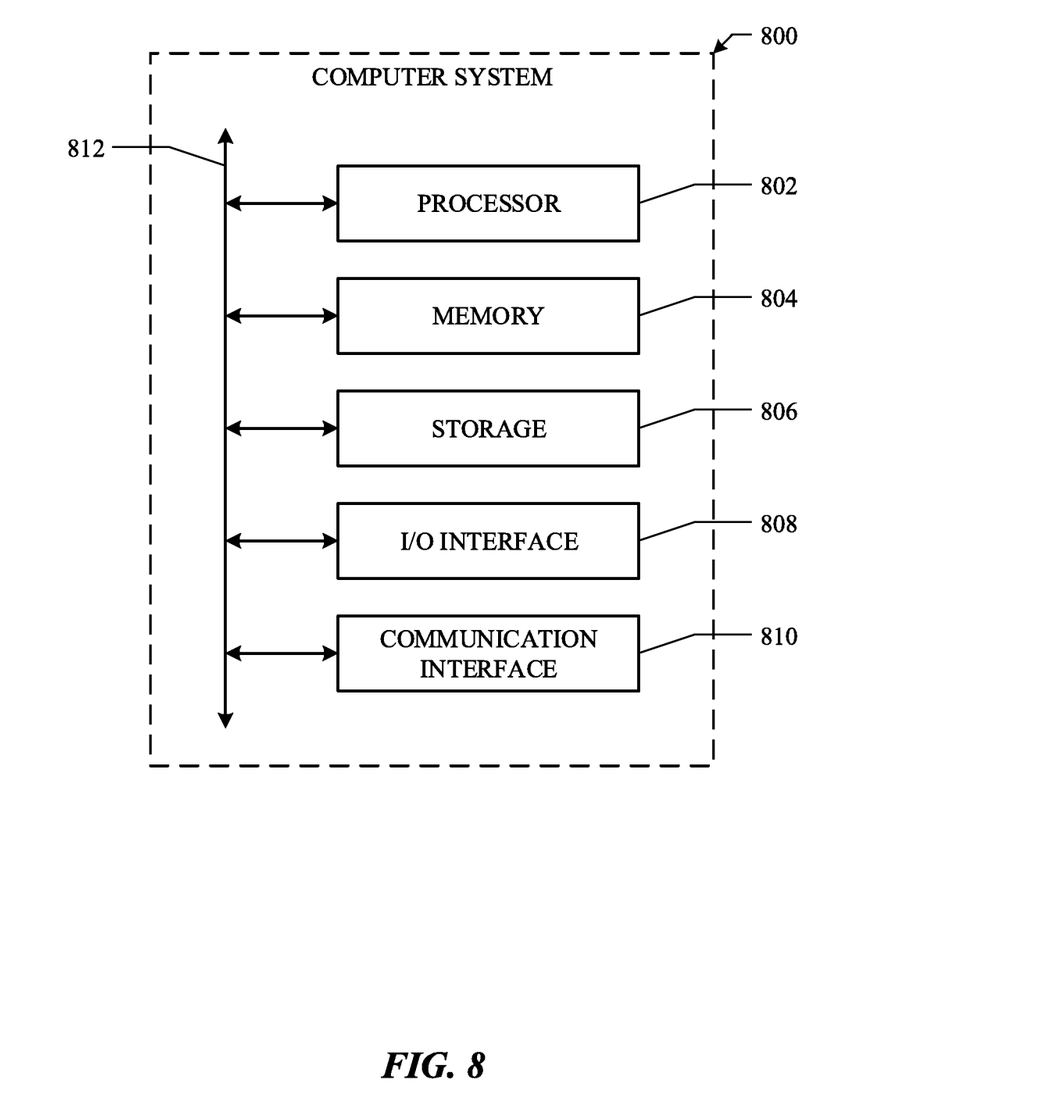
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a server computing device:
   receiving playback statuses from a first user computing device and a second user computing device that are in a synchronous presentation session;
   determining that content presented on the first and second user computing devices are out of synchronization;
   accessing user behavioral rules associated with the first user computing device, wherein the user behavioral rules are learned based on past behavior of a first user in the synchronous presentation session;
   generating a synchronization message to send to the first user computing device based on the user behavioral rules; and
   sending the synchronization message to the first user computing device, wherein the synchronization message comprises instructions for the first user computing device to perform an action to cause the content being presented by the first user computing device to be synchronized with the content being presented by the second user computing device.

2. The method of claim 1, wherein the user behavioral rules are learned further based on past behavior of the first user in previous synchronous presentation sessions with one or more other user computing devices.

3. The method of claim 1, wherein determining that the content presented on the first and second user computing devices are out of synchronization comprises:
   comparing the playback statuses of the content on the first and second user computing devices with an independent clock running on the server computing device; and
   determining that a playback status of the content on the first user computing device is ahead or behind of the independent clock on the server computing device.

4. The method of claim 1, wherein synchronization of the content on the first user computing device with the content on the second user computing device is performed automatically and without explicit user input.

5. The method of claim 1, wherein the user behavioral rules are preset by one or more of the first user computing device, the first user, or a third-party application on the first user computing device.

6. The method of claim 1, wherein the user behavioral rules are learned on a per synchronous-presentation-session basis, on a per user basis, or on a per content-item basis.

7. The method of claim 1, wherein the first and second user computing devices comprise virtual reality devices.

8. The method of claim 7, wherein the content presented on each of the first and second user computing devices is streamed from a third-party content source on a screen in a virtual reality environment.

9. The method of claim 7, wherein a user of each of the first and second user computing devices is represented by a digital avatar in a virtual reality environment.

10. The method of claim 1, wherein the synchronization message is configured to control a playback of the content presented by the first user computing device through an instance of a third-party application on the first user computing device.

11. One or more computer-readable non-transitory storage media embodying software that is operable when executed to:
- receive playback statuses from a first user computing device and a second user computing device that are in a synchronous presentation session;
- determine that content presented on the first and second user computing devices are out of synchronization;
- access user behavioral rules associated with the first user computing device, wherein the user behavioral rules are learned based on past behavior of a first user in the synchronous presentation session;
- generate a synchronization message to send to the first user computing device based on the user behavioral rules; and
- send the synchronization message to the first user computing device, wherein the synchronization message comprises instructions for the first user computing device to perform an action to cause the content being presented by the first user computing device to be synchronized with the content being presented by the second user computing device.

12. The media of claim 11, wherein the user behavioral rules are learned further based on past behavior of the first user in previous synchronous presentation sessions with one or more other user computing devices.

13. The media of claim 11, wherein to determine that the content presented on the first and second user computing devices are out of synchronization, the software is further operable when executed to:
- compare the playback statuses of the content on the first and second user computing devices with an independent clock running on a server computing device; and
- determine that a playback status of the content on the first user computing device is ahead or behind of the independent clock on the server computing device.

14. The media of claim 11, wherein synchronization of the content on the first user computing device with the content on the second user computing device is performed automatically and without explicit user input.

15. The media of claim 11, wherein the user behavioral rules are preset by one or more of the first user computing device, the first user, or a third-party application on the first user computing device.

16. A system comprising: one or more processors; and a non-transitory memory coupled to the processors and comprising software executable by the processors, the processors operable when executing the software to:
- receive playback statuses from a first user computing device and a second user computing device that are in a synchronous presentation session;
- determine that content presented on the first and second user computing devices are out of synchronization;
- access user behavioral rules associated with the first user computing device, wherein the user behavioral rules are learned based on past behavior of a first user in the synchronous presentation session;
- generate a synchronization message to send to the first user computing device based on the user behavioral rules; and
- send the synchronization message to the first user computing device, wherein the synchronization message comprises instructions for the first user computing device to perform an action to cause the content being presented by the first user computing device to be synchronized with the content being presented by the second user computing device.

17. The system of claim 16, wherein the user behavioral rules are learned further based on past behavior of the first user in previous synchronous presentation sessions with one or more other user computing devices.

18. The system of claim 16, wherein to determine that the content presented on the first and second user computing devices are out of synchronization, the processors are further operable when executing the software to:
- compare the playback statuses of the content on the first and second user computing devices with an independent clock running on a server computing device; and
- determine that a playback status of the content on the first user computing device is ahead or behind of the independent clock on the server computing device.

19. The system of claim 16, wherein synchronization of the content on the first user computing device with the content on the second user computing device is performed automatically and without explicit user input.

20. The system of claim 16, wherein the user behavioral rules are preset by one or more of the first user computing device, the first user, or a third-party application on the first user computing device.

* * * * *